United States Patent [19]

Claude

[11] 4,410,477
[45] Oct. 18, 1983

[54] EXTRUSION PROCESS AND APPARATUS USING CHANGEABLE FINE FILTERS

[75] Inventor: Marcel S. Claude, Pomponne Lagny, France

[73] Assignee: Treficable Pirelli, Saint-Maurice, France

[21] Appl. No.: 331,126

[22] Filed: Dec. 15, 1981

[30] Foreign Application Priority Data

Dec. 29, 1980 [FR] France .................... 80 27952

[51] Int. Cl.³ .................... D01D 1/10; B29F 3/10; B01D 25/30
[52] U.S. Cl. ..................... 264/174; 264/169; 425/185; 425/197; 210/100; 210/234; 210/137
[58] Field of Search ............... 264/174, 169; 425/185, 425/197, 145; 210/230, 234, 137, 100, 224

[56] References Cited

U.S. PATENT DOCUMENTS

| | | | |
|---|---|---|---|
| 3,485,905 | 12/1969 | Compa et al. | 425/197 |
| 3,706,827 | 12/1972 | Nott et al. | 264/176 R |
| 3,804,758 | 3/1972 | Cooper et al. | 425/185 |
| 4,107,354 | 8/1978 | Wilkenloh et al. | 264/174 |
| 4,117,063 | 9/1978 | Voigt et al. | 264/174 |

FOREIGN PATENT DOCUMENTS

| | | | |
|---|---|---|---|
| 990221 | 9/1951 | France | 425/197 |
| 643990 | 10/1950 | United Kingdom . | |
| 1043611 | 9/1966 | United Kingdom . | |
| 1047264 | 11/1966 | United Kingdom . | |
| 1211850 | 11/1970 | United Kingdom | 425/197 |
| 2018664 | 10/1979 | United Kingdom . | |

*Primary Examiner*—Charles N. Hart
*Assistant Examiner*—John W. Czaja
*Attorney, Agent, or Firm*—Brooks, Haidt, Haffner & Delahunty

[57] ABSTRACT

A first continuously operating extruder for an extrudable material is fed with filtered such material from a second extruder through a filter and a storage tank having means for applying pressure to the material in the tank. During replacement of a filter, the second extruder is stopped, and the flow of material out of the continuously operating extruder is maintained constant by blocking the passageway between the second extruder and the tank and by applying suitable pressure to the material in the tank until the filter is removed and replaced by a new filter. The blocking device may be separate from a holder for a pair of filters, both the blocking device and the holder being movable by a fluid operable piston and cylinder. Alternatively, a separate blocking device may be omitted, and the filter holder may carry a single filter and have an impermeable portion which provides the blocking function.

17 Claims, 3 Drawing Figures

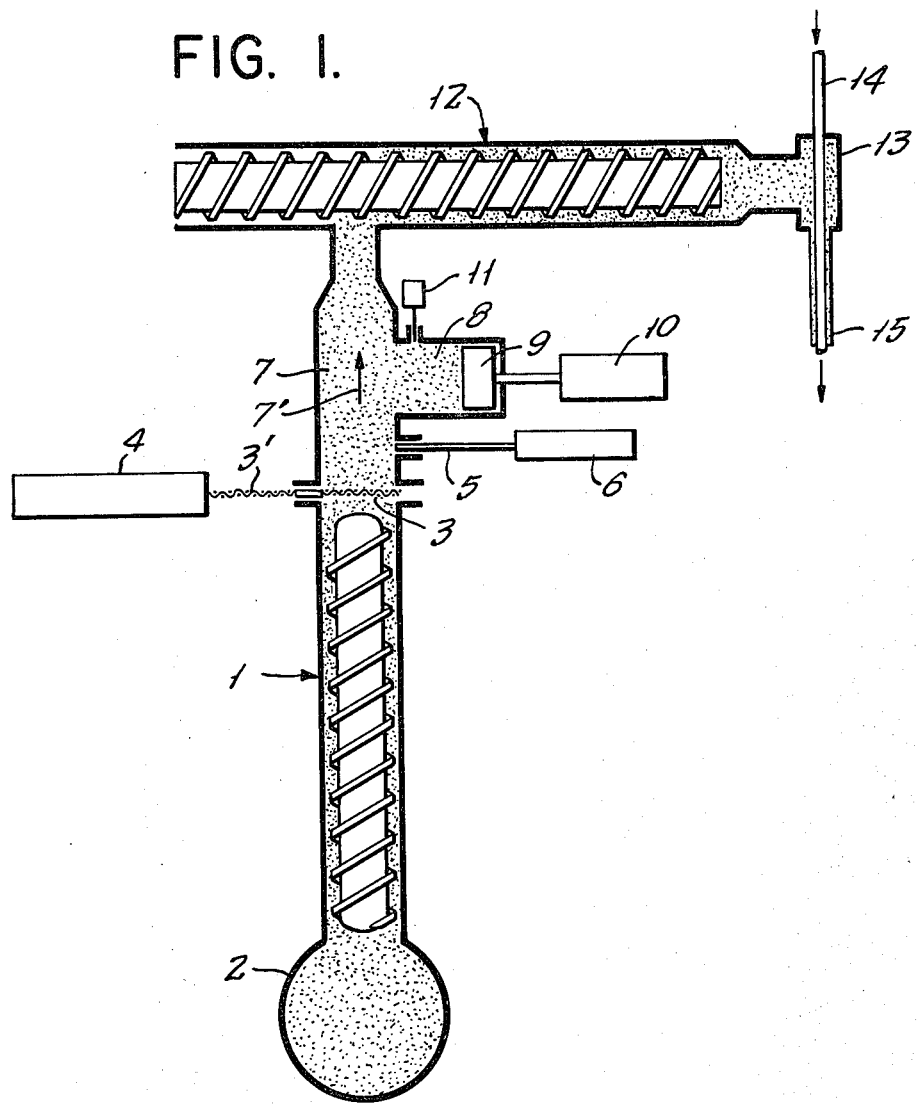
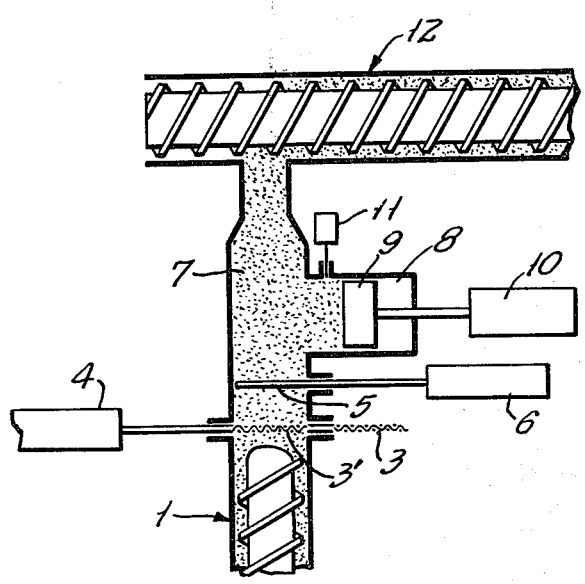
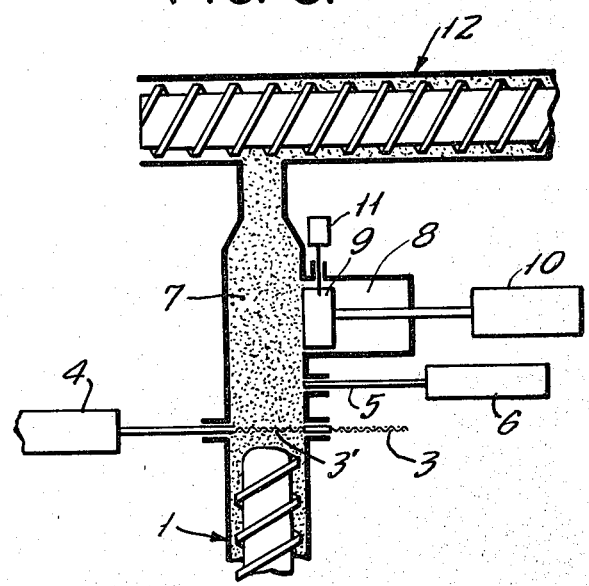

EXTRUSION PROCESS AND APPARATUS USING CHANGEABLE FINE FILTERS

The present invention relates to a process and apparatus for continuous extrusion of a material through a fine filter and, in particular, to process and apparatus for the insulation of electric wires and cables by the extrusion of thermoplastic polymers.

It is often necessary to carry out the filtration of extrudable materials through very fine mesh sieves at various temperatures.

By effecting systematic control over the lines for insulating cables, it has been found that, for making up high voltage electrical cables insulated by polyolefins without mineral charges, which are capable or incapable of cross-linking, the filtration of the insulating material through sieves of a mesh size which does not exceed 40 micrometers has improved very markedly the reliability of the cables produced and has permitted their use under high electrical stresses of the order of 15 to 20,000 volts per millimeter of alternating current with a completely satisfactory life expectancy of 29 to 30 years.

The extrusion of significant quantities of filtered material at this level of purity, and even the filtration through this type of filter, has caused two substantial problems which may appear simultaneously or separately.

The first problem involves the gradual blockage of the filters due to the accumulation of retained impurities. This is exemplified by the extrusion of a high density polyethylene through a filter having a mesh opening of 40 $\mu$m and a surface area of the order of 80 $cm^2$.

The filter is arranged between an extrusion device (a screw plasticiser) and an extrusion head which applies the high density polyethylene to a cable at a rate of 50 kg per hour. It has been found that, depending on the batches of polyethylene, the pressure difference between the faces of the filter increased by 1 to 3 bars per hour, limiting the total of high density polyethylene which can be filtered without changing the filter to between 6 and 15 tons under the conditions for use.

The second problem lies in the fact that the heating experienced by the material as it traverses the filters leads to the degradation thereof if the operation is repeated or to the cross-linking thereof when using a product which can be cross-linked by heating, such as polyethylene which is cross-linked by organic peroxides.

In order to overcome the first problem, attempts have been made to install some travelling filters with a filter belt, but this was not possible in numerous cases owing to excessive leakage or breakage of the belt.

Attempts have also been made to arrange, within the flow of material, a filter which can be changed by a guillotine-type system moved by a hydraulic jack, but this solution requires stopping of the extruder and, therefore, causes, during each change-over of the filter, an absence of material on the continuously travelling cable being insulated.

In order to overcome the second problem, the number of times when the material is heated and extruded is reduced to a minimum, for example, by using high density polyethylene powder in the form in which it leaves the reactor where it is produced, for insulating the cables.

Attempts have also been made to separate the functions of filtration on the upstream extruder and extrusion on the downstream extruder by using a double extruder, one of which, known as the upstream extruder, discharges its product into the feed zone of the second one, known as the downstream extruder, which can be independent.

If the upstream extruder has to be stopped, for the change-over of the filter, even by a rapid process, it was not possible to completely avoid an absence of material on the corresponding cable during the break in the supply of the downstream extruder.

The invention relates to a process for the continuous extrusion of products through a fine filter which process permits the rapid change-over of the filter without causing a significant variation in the flow-rate of the extruded product. In the preferred process, an upstream extruder, supplied with the product to be extruded, supplies a downstream extruder which delivers the product to an extrusion head. The product to be extruded when leaving the upstream extruder traverses in succession a filtration means which can be changed over rapidly, a blocking means and an intermediate tank and then, enters the downstream extruder. During the rapid exchange of the used filter, with a new filter, the upstream extruder is stopped, the inlet of the intermediate tank is blocked, and the product which the tank contains is discharged toward the downstream extruder ensuring the continuity of the supply. When the new filter is in place, the upstream extruder is set into operation again and the blocking means is removed.

The invention also relates to a specific apparatus for carrying out the process comprising an upstream extruder provided with a means for the supply of product to be extruded, a downstream extruder with an extrusion head, characterized in that it comprises, between the upstream extruder and the downstream extruder an intermediate tank, the inlet of which is provided with a filter which can be changed rapidly, a blocking means, and a compartment provided with a jack-controlled piston.

Hereinafter, the terms "upstream" or "inlet" and "downstream" or "outlet" will be used with reference to the direction of flow of the product to be extruded.

Other objects and advantages of the present invention will be apparent from the following detailed description of the presently preferred embodiments thereof, which description should be considered in conjunction with the accompanying drawings in which:

FIG. 1 is a diagrammatic, side elevation view, partly in cross-section, of the preferred embodiment of the apparatus of the invention including upstream and downstream extruders, an intermediate tank, blocking means and filter changing means.

FIG. 2 is similar to FIG. 1 but shows a portion of the apparatus shown in FIG. 1 with the parts in the positions assumed hereby during changing of a filter; and FIG. 3 is similar to FIG. 2 but shows the parts in the positions assumed thereby after a used filter has been replaced by a new filter.

The upstream extruder 1 (of the screw plasticiser type) receives the product to be extruded, for example, in the state of granules, through the spout 2. At the outlet of the extruder 1, there is a filter 3 on a holder controlled by a fluid operable, piston and cylinder assembly, or jack, 4. Further downstream, there is a blocking device 5, such as a blade, controlled by a jack 6, which can prevent flow of the material to be extruded from the upstream extruder 1 to the intermediate tank 7. The arrow 7' includes the direction of flow of the material to be extruded.

A lateral compartment 8, which preferably, is cylindrical, is provided with a piston 9 controlled by a jack 10. A mechanical blocking means 11 permits the piston 9 to be immobilized at the end of its outward travel so as to permit the cleaning of the compartment 8. The force applied by the jack 10 on the piston 9 is regulated so as to keep it in equilibrium during normal operation of the extrusion device.

The material leaving the tank 7 enters into the downstream extruder 12. The material leaving the downstream extruder 12 enters an extrusion head 13 which can be of any known type. In the embodiment shown in FIG. 1, a metal wire 14 passes through the extrusion head 13 in the direction indicated by the arrows, and when it leaves the head 13, it is covered with an insulating layer 15 of the extruded product.

The tank 7 and the compartment 8 illustrated in FIG. 1 are only examples of an embodiment of the invention. Any equivalent means permitting the filtered product which is accumulated in the tank 7 to be discharged towards the downstream extruder 12, under sufficient pressure, may be used to accomplish the objects. The equivalent means can be of the mechanical, pneumatic or hydraulic type, and they should be controlled by a device permitting regulation of the pressure exerted on, and therefore, the flow-rate of, the product discharged into the downstream extruder 12.

The operation of the apparatus for exchanging a new filter with a used filter will now be described. If the partly clogged filter 3 is to be replaced by a new filter 3', the upstream extruder 1 is accelerated for a few moments to fill the reservoir 7 and the compartment 8. The pressure on the piston 9 is such that the piston 9 retracts as the compartment 8 fills (FIG. 1). The upstream extruder 1 is then stopped, the blocking device 5 is positioned so as to block material flow between the tank 7 and the extruder 1 (see FIG. 2) and the jack 10 is supplied with fluid so as to move the piston 9 inwardly toward the tank 7 (FIG. 2) which discharges the filtered product in the tank 7 towards the downstream extruder 12 which is thus supplied, without interruption, and at a constant rate of flow.

During this period, the filter 3 is replaced by the filter 3' by operation of the jack 4, an operation demanding only a few tens of seconds, and then, the blocking means 5 is retracted by the jack 6 and the upstream extruder 1 is simultaneously again set into operation.

Therefore, the extrusion process resumes with the material from the upstream extruder 1 passing through the filter 3' which has taken the place of the used filter 3. The piston 9 is locked at the end of its travel (FIG. 3) by means of the locking device 11, permitting the compartment 8 to be cleaned and permitting a new filter to be substituted in the filter holder for the filter 3 for the next exchange. The piston 9 is then unlocked and is kept immobilized by regulating the pressure of the jack 10 so as to balance the pressure exerted on its front face by the produce being extruded.

It is also possible to replace the filter 3 and to temporarily block the outlet of the upstream extruder 1 during this exchange using a single means. For this purpose, it is sufficient for the filter holder to comprise a solid portion (corresponding to 3' in FIG. 2) which permits blockage of the outlet of the upstream extruder 1 and a filter holding portion corresponding to 3 in the FIGS. Operation is carried out as in the preceding case, except that the blocking device 5 and its associated jack 6 are omitted and movement of solid portion (corresponding to 3') of the filter holder blocks the outlet of the upstream extruder 1 at the same time that the filter 3 is moved into the position shown in FIG. 2. Then, the detachable filter 3 is removed and replaced by a new filter, and the new filter is brought back into the operating position, re-establishing the communication between the upstream extruder 1 and the intermediate tank 7.

The volume of the tank 7 including the compartment 8 is determined in a manner readily apparent to those skilled in the art and takes into consideration the volume of material extruded by the downstream extruder 12 during the time that the upstream extruder 1 is stopped and hence, during the time taken to change the filters. In an assembly delivering 180 liters per hour, the useful volume of the intermediate tank including the compartment 8 will be approximately 1 liter if the filter changing time takes 20 seconds.

The invention applies, in particular, to lines for the insulation of electrical wires and cables by extrusion of thermoplastic polymers, but it can also apply to any extruder in which it is necessary to filter the extruded product before its admission into the extrusion head.

Although preferred embodiments of the present invention have been described and illustrated, it will be apparent to those skilled in the art that various modifications may be made without department from the principles of the invention.

The embodiments of the invention in which an exclusive property or privilege is claimed are defined as follows:

1. A process for the continuous extrusion of a filtered insulating material around a metal wire, said material being filtered during the extrusion of the material, said process comprising:
   continuously feeding said wire through an extrusion head which applies said filtered material around said wire;
   by means of a first extruder having an inlet for receiving the filtered material and an outlet for the filtered material being extruded, extruding the filtered material continuously and under pressure from said outlet and into said extrusion head;
   supplying the filtered material to said inlet at a pressure sufficient to maintain a continuous flow of filtered material out of the outlet of said first extruder by means of a second extruder and through a removable filter, the material flowing from said second extruder in the direction from said second extruder toward said inlet of said first extruder;
   interrupting the supply of said filtered material by said second extruder to said inlet of said first extruder and preventing flow of said material in the direction from said inlet of said first extruder toward said second extruder;
   during the time that the supply of said filtered material by said second extruder to said inlet of said first extruder is interrupted, removing and replacing said filter;
   providing a filtered material storage means connected to said inlet of said first extruder for receiving said filtered material;
   preventing the flow of said filtered material into said storage means but permitting said filtered material to flow into said storage means for a time period in advance of, and terminating at, the interruption of the supply of said filtered material to said inlet by said second extruder, said time period having a duration which permits an amount of said filtered material to enter said storage means which is sufficient to provide a continuous flow of said filtered material from said storage means to said inlet of said first extruder during the time that the supply of said filtered material to said inlet of said first extruder by said second extruder is interrupted; and while the supply of filtered material by said second extruder to said inlet of said first extruder is interrupted, applying pressure to said filtered material stored in the storage means sufficient to deliver filtered material to said inlet of said first extruder at a rate sufficient to maintain a continuous flow of filtered material from the outlet of said second extruder.

2. A process as set forth in claim 1 further comprising resuming the supply by said second extruder of said filtered material to said inlet of said first extruder after said removable filter is replaced and prior to the time that the amount of said filtered material in said storage means is reduced to a point where the continuous flow of said filtered maerial from said extruder is reduced.

3. A process as set forth in claim 1 or 2 wherein said filtered material is supplied to said inlet of said first extruder by said second extruder through a tube interconnecting said second extruder and said inlet of said first extruder, said removable filter being disposed in said tube to filter material passing through said tube, and wherein the supply of said filtered material to said inlet by said second extruder is interrupted by stopping said second extruder and by blocking said tube intermediate said filter and said inlet.

4. A process as set forth in claim 3 wherein prior to interrupting the supply of said filtered material by said second extruder to said inlet of said second extruder, the supply of said filtered material by said second extruder to said inlet is increased relative to its normal rate by an amount sufficient to insure complete filling of said storage means.

5. A method for operating a material extrusion system for extruding filtered insulating material around a wire, said system comprising a first extruder having an inlet and an outlet, an extrusion head connected to the outlet of said first extruder for receiving filtered material therefrom and for applying said filtered material around said wire as it is fed through said head; a second extruder having an inlet and an outlet; a material storage tank having an inlet connected to said inlet of said first extruder for material flow therebetween, a pressure applying means for applying pressure to the material therein, and means for preventing and alternately permitting material flow between said inlet of the tank and said inlet of said first extruder; a material conveying tube interconnecting said outlet of said second extruder to said inlet of said first extruder for material flow therebetween; filtering means insertable into said tube for filtering material flowing therethrough; and blocking means for blocking the flow of material through said tube and said filter, said method comprising:

inserting the filtering means in said tube and unblocking said tube by operating said blocking means;

supplying unfiltered said material to said inlet of said second extruder and operating said extruder to cause it to supply said last-mentioned material to said tube where it is filtered and then passes to said inlet of said first extruder;

while preventing flow of said material into said storage tank, operating said first extruder continuously to extrude material out of said outlet of said first extruder into said extrusion head, said second extruder being normally operated at a rate such that filtered material is supplied to the inlet of said first extruder at a rate which is sufficient to cause said material to flow continuously out of the outlet of said first extruder;

when it is desired to change said filter, permitting said material to flow into said storage tank;

when said storage tank is filled with said material in an amount sufficient to replace the material extruded by said first extruder during the time required to change said filter, stopping said second extruder, blocking said tube with said blocking means and removing said filtering means from said tube;

while said blocking means is blocking said tube, applying pressure by said pressure applying means to the material in said tank in an amount sufficient to cause material in said tank to be supplied to said inlet of said first extruder at a rate which will maintain a continuous flow of the filtered material out of said outlet of said first extruder;

inserting a new filtering means in said tube and unblocking said tube by operating said blocking means; resuming the operation of said second extruder.

6. A method as set forth in claim 5 wherein prior to inserting said blocking means, the rate of operation of said second extruder is increased to insure complete filling of said tank.

7. A method as set forth in claim 5 wherein said pressure applying means is a piston in said tank and wherein when the operation of said second extruder is resumed, said piston is maintained in the position it reaches when said blocking means unblocks the tube.

8. A method as set forth in claim 5 wherein said pressure applying means is a piston in said tank and wherein when operation of said second extruder is resumed, pressure sufficient to equalize the pressure applied to said piston by the material in said tank is applied to said piston.

9. A method as set forth in claim 8 wherein during the time said material is permitted to flow into said storage tank, said piston is moved in a direction which will increase the effective size of the tank.

10. Apparatus for the substantially continuous and substantially constant extrusion of a filtered insulating material around a metal wire during changing of a filter, said apparatus comprising:

a first continuously operable screw extruder having an inlet and an outlet;

an extrusion head connected to said outlet of said first extruder for receiving material therefrom and for applying said material around a metal wire passing therethrough;

a storage tank having an inlet connected to the inlet of said first extruder, means for preventing and alternately permitting the flow of material between said inlet of said tank and said inlet of said first extruder, and a pressure applying means for applying pressure to material in the tank;

a second screw extruder having an inlet and an outlet;

means interconnecting said outlet of said second extruder with said inlet of said tank;

blocking means intermediate said outlet of said second extruder and said inlet of said tank and said inlet of said first extruder for alternately blocking and unblocking the flow of material from said outlet of said second extruder into said tank and into said first extruder; and filter means intermediate said outlet of said second extruder and said blocking means for filtering material flowing from said second extruder to said tank and to said first extruder, said filter being removable from the path of the material flowing from said second extruder to said tank.

11. Apparatus as set forth in claim 10 wherein said pressure applying means is a fluid operable, piston and cylinder assembly with said piston within said tank.

12. Apparatus as set forth in claim 11 wherein said means for preventing and alternately permitting, flow of material between said inlet of said tank and said inlet of said first extruder is a means for preventing movement of said piston.

13. Apparatus as set forth in claim 10 or 11 wherein said blocking means is separate from said filter means and wherein said blocking means and said filter means have separate operating means.

14. Apparatus as set forth in claim 10 or 11 wherein said blocking means and said filter means have common operating means.

15. Apparatus as set forth in claim 10 or 11 wherein said means interconnecting said outlet of said second extruder with said inlet of said tank comprises a tube.

16. Apparatus as set forth in claim 15 wherein said blocking means comprises a blade insertable in and removable from said tube and a fluid operable piston and cylinder means connected to said blade for moving said blade; and wherein said filter means comprises a filter holder having a pair of filters thereon and extending into said tube, and a fluid operable piston and cylinder means connected to said holder for selectively moving one of said filters into said tube.

17. Apparatus as set forth in claim 15 wherein said blocking means and said filter means are on a common support which extends into said tube, said blocking means being impermeable and said filter means being a filter, and a fluid operable piston and cylinder means is connected to said support for selectively positioning one of said blocking means and said filter means in said tube.

* * * * *